United States Patent [19]

Ichimura et al.

[11] 4,088,616

[45] May 9, 1978

[54] METHOD OF PRODUCTION OF A SHEET MATERIAL HAVING A SUPERIOR DURABILITY AND A SPONGE STRUCTURE

[75] Inventors: Hideziro Ichimura; Shizuo Tsuchiya; Yoshihiro Tanba, all of Kurashiki, Japan

[73] Assignee: Kuraray Co., Ltd., Kurashiki, Japan

[21] Appl. No.: 666,292

[22] Filed: Mar. 12, 1976

[30] Foreign Application Priority Data

Mar. 14, 1975 Japan .................................. 50-30860
Mar. 14, 1975 Japan .................................. 50-30861

[51] Int. Cl.$^2$ ............................................. C08J 9/28
[52] U.S. Cl. ......................... 260/2.5 AY; 260/2.5 BE; 264/41
[58] Field of Search ................... 260/2.5 AY, 2.5 BE; 264/41

[56] References Cited

U.S. PATENT DOCUMENTS 3,595,732  7/1971  Tingerthal ..................... 260/2.5 AY

FOREIGN PATENT DOCUMENTS 2,004,276  9/1970  Germany ........................ 260/2.5 AY

*Primary Examiner*—C. Warren Ivy
*Attorney, Agent, or Firm*—Barry Kramer

[57] ABSTRACT

In accordance with the present invention, it has now been found that the coagulation property of polyurethane elastomers can be considerably improved without spoiling any desirable chemical property of the original elastomer, if polyurethane elastomers which are different only in N%, are mixed together in a specified range of mixing ratio or if a polyurethane elastomer is synthesized using a mixture of polymer glycols whose structural units are chemically the same, however, whose molecular weights are different from each other in a specified range, and a solution of the obtained elastomer is coagulated by a specified wet coagulation condition.

5 Claims, No Drawings

METHOD OF PRODUCTION OF A SHEET MATERIAL HAVING A SUPERIOR DURABILITY AND A SPONGE STRUCTURE

The present invention relates to a method of production of a sheet material comprising polyurethane elastomer, having superior durability and a sponge structure. More particularly, the invention relates to a method for improving the wet coagulation property of polyurethane elastomers whose wet coagulation property is generally rather poor, that is, a method for improving the sponge structure forming property of polyurethane elastomers.

Hitherto, polyurethane elastomers have been widely used as a raw material constituting a leather-like sheet material, especially, the sponge structure of polyurethane elastomer has been widely applied for the preparation of surface layers of leather-like sheets such as grain surface, suede surface, etc. In these cases, diols of the polyester series or diols of the polyester series have been ordinarily used, singly or in a blended mixture as the soft segments which constitute the polyurethane elastomers.

However, although polyurethane elastomers whose soft segments consist of a diol of the polyester series can be easily prepared into a sponge structure by conventional wet coagulation methods, a fatal disadvantage of such elastomers is their lack of durability, which is primarily attributable to decrease of various physicochemical properties such as decreases in tensile strength and breaking elongation since the ester linkage in the elastomer has a tendency to be easily decomposed by hydrolysis in the presence of an acid or alkaline substance resulting in the scission of the elastomer molecule. Although polyurethane elastomers whose soft segment consists of a diol of the polyether series do not have the disadvantages of the polyurethane elastomers of the polyesters series mentioned above, it is quite difficult to obtain a nice sponge structure from these elastomers by a wet coagulation method. Therefore, it is very difficult to obtain a product exhibiting the desired sponge structure from a solution of a polyurethane elastomer of the polyether series, by adjusting coagulation behavior in the wet coagulation process.

An improved wet coagulation method has been heretofore proposed, wherein a non-solvent is added to a solution of a polyurethane elastomer of the polyether series to change its state to a gel, in order to form a sponge structure easily by a wet coagulation process. However, though the proposed method can be used mainly for the formation of microporous sponge structure, it cannot be applied for the preparation of other desired sponge structures or for the preparation of a porous sheet of small density, even if coagulation regulators are used.

Furthermore, in order to improve the coagulation behavior of a solution of polyurethane elastomer, another proposal has been made, wherein a portion of the diol of the polyether series employed as the soft segment in the polyurethane elastomer is replaced by a diol of the polyester series which is effective to enhance the coagulation tendency of the resulting polyurethane elastomer, that is, a polyurethane elastomer of the polyester-ether series.

By this replacement, the coagulation behavior of the resulting elastomer is somewhat improved; however, at the same time, the characteristic physico-chemical properties of the polyurethane elastomer of the polyether series are diminished in the polyurethane elastomer of the polyester-ether series corresponding to the content of the polyester. Therefore, this proposal does not simply provide an improvement in the coagulation ability of the polyurethane elastomer of the polyether series itself.

Furthermore, methods have heretofore been proposed to increase only the sponge forming ability of polyurethane elastomers of the polyether series in a wet coagulation process, such as, for example, the nitrogen content originated from isocyanate groups in the polyurethane elastomer (hereafter, the nitrogen content in wt. % will be written as N%) is retained high. The increase of N% does, in fact, result in the improvement of the coagulation ability of the elastomer; however, the sheet material so obtained becomes hard and this is not a desirable property for certain uses.

Generally, the working conditions for producing a nice sponge structure from a solution of polyurethane elastomer whose wet coagulation ability is so poor are unavoidably restricted to a short allowable range; accordingly, such demands as easy workability, nice sponge-forming ability and long durability cannot be satisfied at the same time by the use of conventional polyurethane elastomers of the polyether series.

In accordance with the present invention, it has now been found that the coagulation property of polyurethane elastomers can be considerably improved without spoiling any desirable chemical property of the original elastomer, if polyurethane elastomers which are different only in N%, are mixed together in a specified range of mixing ratio or if a polyurethane elastomer is synthesized using a mixture of polymer glycols whose structural units are chemically the same, however, whose molecular weights are different from each other in a specified range, and a solution of the obtained elastomer is coagulated by a specified wet coagulation condition.

Sheet material is produced by a wet coagulation treatment of a solution of polyurethane elastomer which is synthesized from any glycol chosen from polyether glycol, polylactone glycol and polycarbonate glycol as a soft segment, an organic diisocyanate and a chain extender, wherein the nitrogen content in the elastomer originating from the isocyanate group is in the range of 2.5 to 7 wt. % based upon the weight of polyurethane elastomers (the nitrogen content as a weight percent is represented herein as N%). Solutions of such elastomers generally exhibit a poor wet coagulation ability.

The present invention relates to a method of production of a sheet material having a superior durability and a nice sponge structure, which is characterized by using (1) a polyurethane elastomer which contains at least two polymeric glycols having chemically similar structural units, each in the amount of at least 5 to 95 wt. % based upon the total amount of polymeric glycols as soft segments of the polyurethane elastomer, wherein the molecular weight of each of those polymeric glycols is in the range of 500 to 4000 or more desirably, is 700 to 2000 and the difference in molecular weight between each of said polymeric glycols to be used is 100 to 3500, desirably, 150 to 2000 and more desirably, 200 to 1000 (hereafter, this method is referred to as the "soft segment blending" process), or (2) a mixture of at least two polyurethane elastomers which are synthesized from chemically similar components such as polymeric glycols as a soft segment whose molecular weight is 500 to 4000 and more desirably, 700 to 2000, an organic diisocyanate and a chain extender, wherein the nitrogen content (N%) of each of said at least two kinds of elastomers, is in the range of 2 to 7.5 and the difference of the said nitrogen contents (ΔN%) between the two kinds of elastomers to be used is 0.2 to 4.0 and desirably is 0.5 to 2.0 and the amount of each elastomer is at least 5 to 95 wt. % so as to obtain such a value as 2.5 to 7.0, desirably 3.5 to 6.0 and more desirably 4.0 to 6.0 as the mean value of N% in the resulting mixture (hereafter, this method is referred to as the "N% blending" process).

As stated above, the characteristic feature of the present invention is to use a polyurethane elastomer or a mixture of elastomers, consisting of the same chemical components as those of conventional polyurethane elastomers which should be improved for the purpose of the present invention and accordingly, the present invention has an advantage to improve physical properties such as coagulation property, etc. completely preserving the original chemical properties of the conventional polyurethane elastomer. Upon a choice of polyurethane elastomer as a material for producing a leather-like sheet, hitherto both chemical properties such as antiweathering property, reagent-proof property, etc., and physical properties, especially such as wet coagulation ability have been taken into consideration. However, now it becomes sufficient to examine the availability of the polyurethane elastomer only from a chemical standpoint if the method of the present invention is adopted for the preparation of sheet material.

Polymeric glycols are used in the present invention as the soft segment of the polyurethane elastomer. Polyether glycols have been found to be especially effective. Typical polyether glycols are polyalkylene ether glycols such as polyethylene ether glycol, polypropylene ether glycol, polytetramethylene ether glycol, polyhexamethylene ether glycol, etc. which have an ether linkage in every repeating unit and other polyalkylene ether glycols having a cycloaliphatic structure in every repeating unit. Polylactone glycols which can be obtained by ring opening polymerization of lactones such as butyrolactone, valerolactone, caprolactone, etc. can also be used effectively. Furthermore, polycarbonate glycols which can be obtained from the reaction between a carbonate having active groups, such as diethyl carbonate or phosgene and at least one kind selected from aliphatic glycols such as propylene glycol, tetramethylene glycol, pentamethylene glycol, hexamethylene glycol, decamethylene glycol, etc., glycols having cyclic hydrocarbon structures such as p-xylene glycol, 1,4-cyclohexane diethyl glycol, bisphenol, etc. can also be used.

The molecular weight distribution of the polymeric glycol having many repeating units in its molecular chain structure, which is used in the method of the present invention, is extremely narrow if it is compared with that of any polyester glycol, and the polyurethane elastomer which has such a polymeric glycol as used in the present invention as a soft segment, has generally a poor wet coagulation ability as a characteristic behavior.

The remarkable improvement in the wet coagulation ability of polyurethane elastomers realized by the method of the present invention cannot be obtained employing a polyurethane elastomer having a polyester glycol as a soft segment, which is generally, synthesized by a polycondensation reaction accompanied by dehydration and has a broad molecular weight distribution.

Further, the organic diisocyanate compound used as the hard segment of the polyurethane elastomer, though it is possible in the method of the present invention to use any conventional compound hitherto used widely, is preferably diphenyl methane diisocyanate. Aromatic diisocyanates such as naphthalene diisocyanate, diphenyl diisocyanate, tolylene diisocyanate, xylylene diisocyanate, etc. are also preferred.

Moreover, chain extenders having two active hydrogen atoms which are reactive to the isocyanate group to extend the main chain of the polyurethane molecule in the Zwitter-ion reaction such as glycols, for example, ethylene glycol, propylene glycol, butylene glycol, hexamethylene glycol, etc. and amines such as O,O'-dichloro-p,p'-diamino-diphenyl methane, m-diphenylene diamine, 4-methyl-m-phenylene diamine, ethylene diamine, hexamethylene diamine, etc. can be effectively used. Among them, glycols are more preferable.

As a technique for preparation of polyurethane elastomers having soft segments which are the same in their structural units from a chemical standpoint but differ in the molecular weights of their segments, the following two procedures can be used in the soft segment blending process of the present invention:

(A) Using a mixture of polymeric glycols previously prepared, wherein those glycols are homologous chemically but differ in their molecular weights, the synthesis of polyurethane elastomer is carried out.

(B) At first, polyurethane elastomers whose essential chemical structures are practically the same, are synthesized separately, using various polymeric glycols which are homologous chemically but differ in their molecular weights and then, the resulting polyurethane elastomers are mixed together in an appropriate ratio.

Either by the procedure (A) or (B), desirable polyurethane elastomers can be prepared, which are superior in sponge-structure-forming ability by the wet coagulation method, in fatigue-proof property in repeated bending, in resistance to hydrolysis, and in durability to abrasion etc. and moreover, have a small dependency on temperature, scarcely contain tacky substances, and are superior in solubility to solvent and in solution stability.

In the soft segment blending process of the present invention, there are two necessary conditions on the mean molecular weight of the polymeric glycols to be blended. That is, (1) the molecular weight of the polymeric glycol should be within the range of 500 to 4000 and more preferably, should be within the range of 700 to 2000 and (2) the difference in molecular weights between the two kinds of polymeric glycols should be within the range of 100 to 3500.

If the molecular weight of the polymeric glycol is lower than 500, the Young's modulus of the obtained polyurethane elastomer becomes too high. Accordingly, a sheet material prepared from such a polyurethane elastomer by the wet coagulation procedure, exhibits a reduced bending fatigue resistance, a hardened feeling of the sheet material and a decreased low temperature-proof property of the product. Conversely, if the molecular weight of the polymeric glycol is higher than 4000, a sheet material prepared from the elastomer exhibits too high rubber elasticity, rather poor sponge forming ability and too soft feeling for a practical use. Therefore, it is preferred that the molecular weight of the polymeric glycol should be within the range of 700 to 2000.

If the difference between the molecular weights of the polymeric glycols is extremely large, that is, higher than 3500, sometimes, a partially uneven coagulation of a solution of polyurethane elastomer by the wet coagulation procedure results. If the difference between the molecular weights of the polymeric glycols is less than 100, the wet coagulation ability of the obtained polyurethane elastomer is not sufficient. For these reasons, it is preferred that the difference in molecular weights between said polymeric glycols should be in the range of 150 to 2000 and more desirably, should be in the range of 200 to 1000.

In order to get a satisfactory effect in the method of the present invention, the amount of each polymeric glycol to be used in blending should be more than 5 weight %, and desirably, more than 20 weight % based upon the total amount of polymeric glycols employed.

In the method of the present invention, even if the amount of each polymeric glycol to be used for blending is less than 5 wt. % and the difference in molecular weight between the two nearest kinds of polymeric glycols is less than 100, such a blending of many polymeric homologues may occasionally fit the necessary conditions for the soft segment blending process of the present invention if the blended mixture of polymeric diols can be classified into two fractions wherein the difference of molecular weights of the two fractions is in the range of 100 to 3500 and moreover, each amount of them is more than 5 wt. %. However, since such a blending of polymeric diols which satisfies the necessary conditions for the soft segment blending process, can be realized only when a blending of so many kinds of polymeric homologues, whose difference of molecular weights between the two nearest polymers is so small, is carried out, it is a tedious matter to carry out practically.

Thus, in the present invention, said two necessary conditions for the soft segment blending process have been established.

In the N% blending process of the present invention, though N% of the polyurethane elastomers which are used for blending is not restricted so severely, it is desired to be within the range of 2 to 7.5, and the difference of N% between the two elastomers is necessarily within the range of 0.2 to 4.0 of each other. In case the said difference of nitrogen contents is smaller than said range, it is impossible to achieve a sufficient effect for the purpose of the present invention. On the other hand, if the difference of nitrogen contents is extremely large such as larger than the said range, partial phase separation of a solution of polyurethane elastomer when it is treated for coagulation by a wet coagulation procedure sometimes occurs, resulting in an uneven coagulation of polyurethane elastomer.

The amount of blending of each polyurethane elastomer in the N% blending process, is desired to be 5 to 90 wt. %, and more desirably, is 20 to 80 wt. % based upon the total amount of polyurethane elastomers to be used for blending. Moreover, the mean N% of the blended mixture of polyurethane elastomers ranges from 2.5 to 7.0, and more desirably from 3.5 to 6.0, with 4.0 to 6.0 being most desired.

Further, in the N% blending process of the present invention, any conventional technique for mixing can be employed and the mixing time can be determined properly, according to the mixing techniques.

In the method of the present invention, since it is intended to use polyurethane elastomers having practically the same chemical constitution and accordingly, as expected they are almost similar to each other in their solubilities to solvents and also in their coagulation behaviors in both blending processes, it is a necessary condition for the polymeric glycol used as the soft segment of the polyurethane elastomer to have the same chemical unit. The weight ratio of the soft segment contained in the polyurethane elastomer is the largest, basically, and accordingly, the soft segment has an important role in the determination of the physico-chemical properties of the resulting elastomer. Therefore, it is not desirable for the present invention to use polymeric glycols which have different chemical structures as blending components, since the polyurethane elastomers derived from such different polymeric glycols differ from each other considerably in their solubilities to solvents and also in their coagulation behaviors.

The purpose of the present invention is to produce superior sheet materials, using the polyurethane elastomers specified hereinabove and applying any conventional wet coagulation technique. That is, a solution of polyurethane elastomer specified in the present invention is prepared at first and then a base body consisting of fiber is impregnated and/or coated with the elastomer solution and dipped in a coagulation bath to produce a sheet material having an uniform sponge structure. In accordance with the present invention, a durable sheet material of nice sponge structure is produced. Furthermore, by the method of the present invention, it is possible to produce a film by a wet process, that is, the solution of polyurethane elastomer is coated on a proper support and then the film layer coated on the support is coagulated in a coagulation bath and is thereafter separated from the support. Such a process for making films or sheet is described, for example, in U.S. Pat. Nos. 3,424,604, 3,067,482 and 3,208,875.

The solvents which can be used for preparation of a solution of polyurethane elastomer include, for example, N,N-dimethyl formamide, N,N-dimethyl acetamide, dimethyl sulfoxide, tetrahydrofuran, tetramethyl urea, dioxane, γ-butyrolactone and the like.

Coagulation of the solution of polyurethane elastomer can be effected in a coagulation bath containing any non-solvent for the polyurethane elastomer, which is miscible with the solvent for the elastomer. However, if the non-solvent alone is used, too rapid coagulation occurs nonuniformly, resulting in a skin formation on the surface of the film layer of the solution of polyurethane elastomer coated on a base material and ultimately resulting in a wrinkled skin appearance. Such problems as mentioned above can be eliminated by the use of a non-solvent diluted with the solvent for the polymer to reduce its coagulation rate. However, in this case, if the dilution of non-solvent with solvent is too great, another problem may occur, i.e., a retardation of coagulation of the elastomer solution or further, an inhibition of coagulation may occur.

Therefore, the composition of the mixture of solvent and non-solvent is maintained within a specific range for proper coagulation of the elastomer solution, for example, such as 20:80 to 70:30, each in weight. This range is especially effective for the method of the present invention.

The concentration of polyurethane elastomer solution which can be used effectively in the method of the present invention, is 7 to 30 wt. % and more preferably, is 10 to 20 wt. %. Moreover, the viscosity of the solution is also desired to have an optimum value such as, the viscosity of a 10 wt. % dimethyl formamide solution at 30° C. is desired to be 0.5 to 10 poise and more desirably to be 1 to 7 poise.

In the method of the present invention, the use of a proper coagulation regulator together with the nonsolvent-solvent mixture mentioned above assists in the production of sheet material having the desired sponge structure. Examples of such coagulation regulators are disclosed, for example, in U.S. Pat. No. 3,348,963 and U.S. Pat. No. 3,483,015.

Furthermore, other various additives may be admixed with the solution of the polyurethane elastomer, such as coloring agents, activators, stabilizing agents, and the like. It is also possible to add other polymers to the elastomer solution such as polyacrylonitrile, polyvinyl acetate, polyvinyl chloride, polymethacrylic acid esters, polyacrylic acid esters, polymers of halogenated vinyl compounds, and the like.

The following examples further illustrate the present invention. Unless otherwise stated, all percentages and parts are by weight.

EXAMPLE 1

Using 535 parts of a mixture of polymeric glycols (whose mean molecular weight was 1135) consisting of 26% of a poly-tetra-methylene glycol (hereafter, referred to as PTMG) whose molecular weight was 850, 34% of a PTMG whose molecular weight was 1100 and 40% of a PTMG whose molecular weight was 1350, 402 parts of p,p'-diphenyl methane diisocyanate and 63 parts of ethylene glycol, a polyurethane elastomer whose N% was 4.5, was synthesized. Then, a solution of polyurethane elastomer, consisting of 14% of the obtained polyurethane, 1% of stearyl alcohol, 2% of water and 83% of N,N-dimethyl formamide (hereafter, referred to as DMF) was prepared.

The solution was applied over a surface of a glass plate to form a layer of 1 mm in thickness and the layer was coagulated by dipping it in a coagulation bath conssiting of 30% of DMF and 70% of water, at 30° C. The coagulated film layer was washed with water to remove the DMF contained in the film and finally, the film was dried using a hot air stream at 90° C.

The obtained film had a flat and smooth surface and a soft feeling since it had a nice sponge structure and moreover had a superior durability. When this film was fixed on a soft substrate and finished by coloring, it was found that the film was very suitable for use as a synthetic leather.

For comparative purposes, other experiments were carried out. That is, 3 kinds of polyurethane elastomers (N% 4.5) were prepared as in Example 1 except for one condition regarding the polymeric glycol. In each of the comparative examples, only one PTMG whose molecular weight was 850, 1100 and 1350, respectively, was solely used as the soft segment of the polyurethane elastomer, in place of the mixture of three kinds of PTMG in Example 1. Then, films were prepared from those 3 polyurethane elastomers applying the wet coagulation technique as in Example 1.

Coagulation tendencies of those polyurethane solutions and physical properties of the obtained films are listed in Table 1, wherein the physical properties (breaking elongation and Young's modulus) were observed on films prepared by a conventional dry process.

Further, though the coagulation tendency of polyurethane elastomer solutions can be easily evaluated visually through a microscopic observation on the obtained sponge structure, a numerical representation of the coagulation tendency was also tried as shown in Table 1, wherein S-value was adopted as the representation of the coagulation tendency.

Here, S-value is defined by the following equation (I)

$$S = (T\text{wet} - T\text{dry})/T\text{dry} \ldots \quad (I)$$

$T$dry: thickness (mm) of a film prepared by a dry process
$T$wet: thickness (mm) of a film prepared by a wet process.

As shown by the equation (I), the value of S corresponds to the porosity of a film prepared by a wet coagulation process, taking the S-value of a film prepared by a dry process as zero standard, wherein the film prepared by the dry process can be considered to have practically no pores. Moreover, it can be understood from Table 1 that there is a nice parallelism between S-value defined here and the visual evaluation on the uniformity of sponge or the flat ans smoothness of a film surface prepared by the wet process. The larger value of S indicates the better sponge forming ability.

Furthermore, a final evaluation of the polyurethane elastomers as a material for leather-like sheet from the commercial standpoint was made, classifying into ten steps from 1 to 10 (10 being best) and is listed in Table I as a reference.

In case of polyurethane elastomers derived from one kind of polymer glycol as a soft segment such as in the comparative examples, they exhibit a poor wet coagulation ability and give a film of inferior sponge structure which is unsuitable for use as a material for leather-like sheet.

Table I

| | Film No. | Mol. Wt. of soft segment | Elongation (%) | Young's Modulus (Kg/mm$^2$) | Coagulation tendency | | | Commercial evaluation |
| | | | | | S-value | Uniformity of sponge | Evenness of surface | |
|---|---|---|---|---|---|---|---|---|
| Example | 1 | 1135 (mean) (mix. type) | 550 | 2.1 | 2.0 | very good | very good | 10 |
| Comparative Example | 2 | 850 | 510 | 2.3 | 0.3 | bad | fair | 2 |
| | 3 | 1100 | 540 | 2.2 | 0.3 | bad | poor | 2 |
| | 4 | 1350 | 600 | 2.2 | 0.2 | bad | bad | 1 |

EXAMPLE 2

A polyurethane elastomer whose nitrogen content (N%) was 4.0, was prepared, using 595 parts of PTMG whose molecular weight was 1000, 357 parts of p,p'-diphenyl methane diisocyanate (hereafter, referred to as MDI) and 47 parts of ethylene glycol. In the same way, a polyurethane elastomer whose N% was 5.0, was prepared, using 478 parts of PTMG whose molecular weight was same as that above, 447 parts of MDI and 76 parts of ethylene glycol. Successively, in the same manner, using PTMG whose molecular weight was 1000, MDI and ethylene glycol but changing their compositions, 4 polyurethane elastomers were prepared whose N% were 2.0, 3.0, 6.0 and 8.0, respectively. Thus, 6 kinds of polyurethane elastomers were prepared for further tests.

Dissolving these polyurethane elastomers solely or mixing each other into DMF, various polyurethane elastomer solutions of about 20% concentration were obtained.

Each of these solutions was poured onto a polyethylene sheet and formed into a film layer of 0.8 mm thickness and then, the film layer was coagulated by dipping it in a coagulation bath consisting of 50% of DMF and 50% of water, at 50° C. After coagulation, the obtained film was placed in a hot water bath maintained at 85° C. for 1 hr. to remove DMF completely from the film and then it was dried.

Eleven films were prepared by the wet coagulation process and the physical properties of the films were tested as in Example 1. The results are summarized in Table 2.

From Table 2, the following facts can be clearly understood. In case of a straight polyurethane elastomer (not made from a blend of polyurethane elastomers) and containing rather a small amount of nitrogen (see comparative examples, film No. 5, 6 and 7 in Table 2), the coagulation ability of the elastomer is rather poor and it cannot be formed into a superior sponge structure. On the other hand, in the case of straight elastomers (not a blend of elastomers) and containing a larger amount of nitrogen (see comparative examples, film No. 8 and 9), though the coagulation ability is improved with the increase of nitrogen content, the breaking elongation of the polyurethane elastomer decreases so much and its Young's modulus becomes high, that is, the elastomer is hard and accordingly, gives a hard film. Therefore, this kind of polyurethane elastomer cannot be used as a material for production of leather-like sheet of porous structure. Against these disadvantages in the comparative examples, in case of a blended polyurethane elastomer within the scope of the present invention (see film No. 10, 11, 12, 13 and 14), the wet coagulation ability of the polyurethane elastomer is very good and from such an elastomer, it is possible to produce a sheet material having a sponge structure of superior physical properties. However, even if it is a blended polyurethane elastomer, it never can be used as a sheet material of sponge structure if the blending conditions are not proper as shown in Table 2. As a comparative example, film No. 15, wherein two kinds of polyurethane elastomers whose nitrogen contents were extremely different, were mixed together under blending conditions outside the desired range of the present invention, as a result, wet coagulation occurs very non-uniformly.

Table 2

| | Film No. | N% 3 | N% 4 | N% 5 | N% 6 | N% 8 | Mean N% | Elongation (%) | Young's modulus (kg/mm$^2$) | S-value | Uniformity of sponge | Evenness of surface | Commercial evaluation |
|---|---|---|---|---|---|---|---|---|---|---|---|---|---|
| Comparative Example | 5 | 100 | | | | | 3 | 790 | 0.8 | 0.1 | bad | good | 1 |
| | 6 | | 100 | | | | 4 | 540 | 3.1 | 0.2 | bad | fair | 1 |
| | 7 | | | 100 | | | 5 | 420 | 13 | 0.3 | bad | poor | 2 |
| | 8 | | | | 100 | | 6 | 250 | 35 | 1.5 | fair | good | 4 |
| | 9 | | | | | 100 | 8 | 170 | 52 | 1.5 | good | very good | 3 |
| Example | 10 | | 50 | | 50 | | 5.0 | 430 | 11.8 | 1.8 | very good | very good | 8 |
| | 11 | | 30 | 40 | 30 | | 5.0 | 450 | 10 | 2.1 | very good | very good | 10 |
| | 12 | | 50 | 50 | | | 4.5 | 455 | 2.8 | 1.7 | very good | very good | 10 |
| | 13 | 50 | | 50 | | | 4.0 | 480 | 2.6 | 1.0 | fair | good | 7 |
| | 14 | | | 50 | 50 | | 5.5 | 390 | 16 | 2.0 | very good | very good | 8 |
| Comparative Example | 15 | 50 | | | | 50 | 4.5 | 350 | 15 | 0.7 | fair | bad | 5 |

EXAMPLE 3

A polyurethane elastomer whose N% was 5.2 was synthesized, using 442 parts of a blended polymeric glycol whose mean molecular weight was 1460, consisting of 54% of a polypropylene ether glycol whose molecular weight was 1000 and 46% of a polypropylene ether glycol whose molecular weight was 2000, 464 parts of MDI and 94 parts of ethylene glycol.

A DMF solution of the obtained polyurethane elastomer, consisting of 18% of the elastomer, 1% of carbon black and 81% of DMF, was prepared.

The solution was poured onto a surface of a glass plate and formed into a uniform layer of 1 mm thickness, the layer was coagulated by dipping the glass plate in a coagulation bath consisting of 50% of DMF and 50% of water, at 65° C., the coagulated film was washed with water to remove DMF completely and finally, the film was dried at 90° C using a hot air stream.

The resulting film had a flat, smooth surface and a micro-porous sponge structure, wherein the mean diameter of the micro-pores was several microns. Only a small decrease of degree of polymerization of the polyurethane elastomer occurred by a dipping treatment of the obtained film in a hot water at 90° C. for 4 days. The film prepared in this example had a superior durability in its characteristic properties for a long period.

COMPARATIVE EXAMPLE 1

A polyurethane elastomer whose N% was 5.2, was synthesized, using 442 parts of polypropylene ether glycol whose molecular weight was 1460, 464 parts of MDI and 94 parts of ethylene glycol. A film was prepared from the obtained polyurethane elastomer just in the same way as in Example 3.

The obtained film was inferior in its surface evenness and smoothness and moreover, inferior in its sponge forming ability. Therefore, it was concluded that the polyurethane elastomer obtained in Comparative Example 1 is not proper for use as a leather-like sheet material.

COMPARATIVE EXAMPLE 2

A polyurethane elastomer whose N% was 5.2 was synthesized, using 442 parts of a blended polymeric glycol, whose mean molecular weight was 1460, consisting of 80% of a polypropylene ether glycol whose molecular weight was 400 and 20% of a polypropylene ether glycol whose molecular weight was 5700, 464 parts of MDI and 94 parts of ethylene glycol. A film was prepared from the obtained polyurethane elastomer in the same way as in Example 3.

Though it was possible to get a film of micro-porous sponge structure, the obtained film was uneven owing to nonuniform coagulating of the elastomer solution and accordingly, its commercial value was low.

EXAMPLE 4

A polyurethane elastomer, whose N% was 5.2, was synthesized, using 595 parts of a blended polymeric glycol, whose mean molecular weight was 1000, consisting of 10% of a polycaprolactone glycol (hereafter, referred to as PCL) whose molecular weight was 500, 60% of a PCL whose molecular weight was 1000 and 30% of a PCL whose molecular weight was 1500, 357 parts of MDI and 48 parts of ethylene glycol.

A solution was prepared, which consisted of 25% of the obtained polyurethane elastomer, 72% of DMF, 1.5 parts of sorbitan mono-stearate as a softening agent and 1.5% of stearyl alcohol.

A non-woven fabric, consisting of staple fibers of Nylon-6 of 2 deniers, was dipped in said solution and was impregnated therewith and again, onto the fabric, a solution of the synthesized polyurethane solution, consisting of 22% of the elastomer, 76.5% of DMF, 0.5% of stearyl alcohol and 1% of carbon black, was poured and formed into a uniform layer of 0.8 mm thickness. Then, the treated fabric was dipped in a wet coagulation bath consisting of 50% of DMF and 50% of water, at 50° C for coagulation. A sheet material obtained by the wet coagulation treatment was washed with water to remove DMF completely and then dried.

The sheet material thus obtained had a nice sponge structure. Then, a surface of the sheet was treated for finishing such as coloring, embossing, etc. Thus, a leather-like sheet material was prepared.

The obtained leather-like sheet material had a soft feeling and was superior in durability to fatigue by a repeated bending test, resistance to abrasion, resistance to hot water and alkali-proof property.

EXAMPLE 5

A polyurethane elastomer, whose N% was 4.5, was synthesized, using 553 parts of a blended polymeric glycol, whose mean molecular weight was 1566, consisting of 33% of a polycarbonate glycol (hereafter referred to as PCG) which was derived from bisphenol A and phosgene and whose molecular weight was 800, 34% of a PCG whose molecular weight was 1500 and 33% of a PCG whose molecular weight was 2400, 357 parts of MDI and 91 parts of 1,4-butane diol.

A solution of the obtained polyurethane elastomer, consisting of 18% of the elastomer, 1% of stearyl alcohol, 1% of water and 80% of DMF, was prepared.

The solution was poured onto a glass plate and formed into a uniform layer of 1 mm thickness. Then, the glass plate was dipped in a wet coagulation bath consisting of 50% of DMF and 50% of water, at 50° C., to coagulate the coated layer of the elastomer solution. The obtained film was washed with water to remove DMF completely and then dried at 90° C. using a hot air stream.

The surface of the film this prepared was flat and smooth and the feeling of the film was very soft since it had a nice sponge structure. Moreover, the durability of the film was superior. When the film was fixed on a surface of a soft base body and finished by coloring, a product which was preferable to use as a synthetic leather was prepared.

EXAMPLE 6

A polyurethane elastomer, whose N% was 4.2, was synthesized, using 572 parts of polypropylene ether glycol (hereafter referred to as PPG) whose molecular weight was 1000, 375 parts of MDI and 53 parts of ethylene glycol. Further, a polyurethane elastomer, whose N% was 5.0, was synthesized, using 478 parts of PPG whose molecular weight was 1000, 447 parts of MDI and 76 parts of ethylene glycol. Furthermore, a polyurethane elastomer, whose N% was 5.8, was synthesized, using 384 parts of PPG whose molecular weight was 1000, 518 parts of MDI and 98 parts of ethylene glycol.

A solution was prepared, which consisted of 6% of said polyurethane elastomer whose N% was 4.2, 6% of said polyurethane elastomer whose N% was 5.0, 6% of said polyurethane elastomer whose N% was 5.8, 81% of DMF and 1% of carbon black.

The solution was poured onto a glass plate and formed into a uniform layer of 1 mm thickness and the glass plate was dipped in a wet coagulation bath consisting of 50% of DMF and 50% of water, at 60° C., to coagulate the layer on the glass plate to a sponge structure. The obtained film was washed with water to remove DMF completely and then dried at 90° C using a hot air stream.

The film thus prepared had a flat and smooth surface and a soft feel. Moreover, its durability was superior. It was possible to produce a sheet material preferable to use as a synthetic leather for shoe making by fixing the obtained film on a soft base body and finishing by coloring.

What is claimed is:

1. In the production of a sheet material by a coagulation treatment of a solution of polyurethane elastomer, which is synthesized from a polymeric glycol selected from the group consisting of polyether glycols, polylactone glycols and polycarbonate glycols as the soft segment, an organic diisocyanate and a chain extender, wherein the nitrogen content in the elastomer originating from the isocyanate group is in the range of 2.5 to 7 wt. % based upon the total weight of polyurethane elastomer, in a coagulation bath, a method for production of a sheet material having a superior durability and a sponge structure, which is characterized by using, as the polyurethane elastomer
   (1) a polyurethane elastomer which contains at least two polymeric glycols which are homologous chemically but differ in molecular weights, each in the amount of at least 5 to 95 weight % based upon the total amount of polymeric glycols, as soft segments of the polyurethane elastomer, wherein the molecular weight of each of said polymeric glycols is in the range of 500 to 4000 and the difference of molecular weights between each of said polymeric glycols is in the range of 100 to 3500, or
   (2) a mixture of at least two polyurethane elastomers which are synthesized from the same chemical components; namely, a polymeric glycol as the soft segment whose molecular weight is 500 to 4000, an organic diisocyanate and a chain extender, wherein the content of nitrogen in each of these elastomers originating from the isocyanate group is 2 to 7.5 wt. %, the difference in said nitrogen content between each of said elastomers is in the range of 0.2 to 4.0 wt. %, and the amount of each elastomer in the mixture ranges from 5 to 95 wt., % so as to obtain a mean content of nitrogen originating from the isocyanate group of from 2.5 to 7.0 wt. % in the blended mixture, and in which the coagulation bath comprises a mixture of a solvent and a non-solvent for the polyurethane elastomer, the weight ratio of the solvent and non-solvent being in the range of 20:80 to 70:30.

2. A method as set forth in claim 1, wherein the soft segment of the polyurethane elastomer is a polyether glycol.

3. A method as set forth in claim 2, wherein the soft segment of the polyurethane elastomer is a glycol selected from the group consisting of polyethylene glycol, polypropylene glycol, polytetramethylene glycol and polyhexamethylene glycol.

4. A method as set forth in claim 1, wherein the soft segment of the polyurethane elastomer is a polylactone glycol.

5. A method as set forth in claim 4, wherein the soft segment of the polyurethane elastomer is polycaprolactone glycol.

* * * * *